United States Patent
Jackson (12)

(10) Patent No.: US 10,400,899 B2
(45) Date of Patent: Sep. 3, 2019

(54) FLUID FLOW CONTROL APPARATUS FOR USE WITH FLUID VALVES

(71) Applicant: FISHER CONTROLS INTERNATIONAL, LLC, Marshalltown, IA (US)

(72) Inventor: Trenton Frank Jackson, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 0 days.

(21) Appl. No.: 15/658,152

(22) Filed: Jul. 24, 2017

(65) Prior Publication Data

US 2019/0024805 A1 Jan. 24, 2019

(51) Int. Cl.
*F16K 3/24* (2006.01)
*F16K 5/18* (2006.01)
(Continued)

(52) U.S. Cl.
CPC .............. *F16K 3/243* (2013.01); *F16J 15/32* (2013.01); *F16K 1/46* (2013.01); *F16K 3/246* (2013.01);
(Continued)

(58) Field of Classification Search
CPC .......... F16K 3/246; F16K 3/243; F16K 3/262; F16K 3/267; F16K 3/314; F16K 3/18;
(Continued)

(56) References Cited

U.S. PATENT DOCUMENTS 2,456,356 A * 12/1948 Aber .................. F16J 15/32
277/584
3,687,465 A * 8/1972 Grime .................. F16J 15/028
277/619
(Continued)

FOREIGN PATENT DOCUMENTS

CN 103672157 3/2014
DE 10158577 7/2003
(Continued)

OTHER PUBLICATIONS

International Searching Authority, "Internationals Search Report and Written Opinion," issued in connection with International Patent Application No. PCT/US2018-040840, dated Sep. 27, 2018, 12 pages.

*Primary Examiner* — Reinaldo Sanchez-Medina
*Assistant Examiner* — David Colon-Morales
(74) *Attorney, Agent, or Firm* — Hanley, Flight & Zimmerman, LLC (57) ABSTRACT

Fluid flow control apparatus for use with fluid valves are disclosed. An apparatus includes a plug for a sliding stem fluid valve. The plug has a first portion slidably coupled to a second portion. The apparatus also includes a cavity formed in an outer circumferential surface of the plug by the first portion and the second portion. A dimension of the cavity changes when the first portion slides relative to the second portion to displace a seal disposed in the cavity. The seal sealingly engages a cage of the fluid valve when the second portion contacts a seat of the fluid valve.

21 Claims, 3 Drawing Sheets

(51) Int. Cl.
 *F16J 15/32* (2016.01)
 *F16K 1/46* (2006.01)
 *F16K 3/26* (2006.01)
(52) U.S. Cl.
 CPC .............. *F16K 3/262* (2013.01); *F16K 5/184* (2013.01); *F16K 5/188* (2013.01)
(58) Field of Classification Search
 CPC .. F16K 3/188; F16K 5/184; F16K 1/46; F16J 15/32
 USPC ........................................................ 251/175
 See application file for complete search history.

(56) References Cited

U.S. PATENT DOCUMENTS

| | | | |
|---|---|---|---|
| 4,274,433 A | 6/1981 | Schnall | |
| 4,722,507 A * | 2/1988 | Lindackers | F16J 15/164 |
| | | | 137/625.3 |
| 5,236,014 A * | 8/1993 | Buls | F16K 39/04 |
| | | | 137/625.3 |
| 6,173,965 B1 * | 1/2001 | Niessen | F15B 15/065 |
| | | | 277/448 |
| 7,373,951 B2 * | 5/2008 | Gossett | F16K 47/08 |
| | | | 137/625.33 |
| 8,167,269 B2 * | 5/2012 | Bell | F16K 47/08 |
| | | | 251/325 |
| 8,714,560 B2 * | 5/2014 | Faas | F16J 15/3236 |
| | | | 277/530 |
| 9,022,070 B2 * | 5/2015 | Anderson | F16K 1/487 |
| | | | 137/625.3 |
| 9,206,909 B2 * | 12/2015 | Collison | F16K 41/10 |
| 9,395,019 B2 * | 7/2016 | Cunningham | F16K 3/246 |
| 2002/0017327 A1 * | 2/2002 | Kawaai | F16J 9/08 |
| | | | 137/625.3 |
| 2006/0049375 A1 * | 3/2006 | Gossett | F16J 15/0806 |
| | | | 251/357 |
| 2009/0146096 A1 * | 6/2009 | Davies, Jr. | F16K 1/48 |
| | | | 251/333 |
| 2013/0248751 A1 * | 9/2013 | Anderson | F16K 1/465 |
| | | | 251/359 |
| 2013/0320252 A1 * | 12/2013 | Hageman | F16K 3/246 |
| | | | 251/324 |
| 2014/0137947 A1 * | 5/2014 | Cunningham | F16K 39/022 |
| | | | 137/12 |
| 2015/0001432 A1 | 1/2015 | Cunningham | |
| 2015/0013790 A1 * | 1/2015 | Hoff | F16K 27/02 |
| | | | 137/553 |
| 2015/0276065 A1 * | 10/2015 | Yoshida | F16K 1/34 |
| | | | 251/333 |

FOREIGN PATENT DOCUMENTS

| | | |
|---|---|---|
| GB | 860570 | 2/1961 |
| WO | 2019022931 | 1/2019 |

* cited by examiner

FLUID FLOW CONTROL APPARATUS FOR USE WITH FLUID VALVES

FIELD OF THE DISCLOSURE

This disclosure relates generally to fluid flow control devices and, more particularly, to fluid flow control apparatus for use with fluid valves.

BACKGROUND

Process control systems employ fluid valves to regulate process fluids (e.g., water, natural gas, etc.). A fluid valve typically controls an output flow of a process fluid by moving (e.g., moving via an actuator) a valve plug between different positions relative to a valve seat. To avoid leaks and/or undesired changes in fluid pressure during normal use, certain fluid valves (e.g., sliding stem fluid valves) utilize valve plugs having seals (e.g., O-rings). Such seals can be constructed out of particular materials (e.g., rubber, metal, graphite, etc.) to accommodate different types of fluid control applications, such as supplying feed water to a boiler.

SUMMARY

An example apparatus disclosed herein includes a plug for a sliding stem fluid valve. The plug has a first portion slidably coupled to a second portion. The apparatus also includes a cavity formed in an outer circumferential surface of the plug by the first portion and the second portion. A dimension of the cavity changes when the first portion slides relative to the second portion to displace a seal disposed in the cavity. The seal sealingly engages a cage of the fluid valve when the second portion contacts a seat of the fluid valve.

Another example apparatus includes a fluid valve having a fluid flow control member. A first portion of the fluid flow control member is fixedly coupled to a stem of the fluid valve and a second portion of the fluid flow control member is slidably coupled to the stem and the first portion. The second portion contacts a seat of the fluid valve. The first portion and the second portion define a cavity to hold a seal between an outer surface of the fluid flow control member and a cage of the fluid valve. When the second portion engages the seat, the first portion moves toward the second portion to reduce a volume of the cavity to displace the seal toward the cage.

Another example apparatus includes a fluid flow control member operatively coupled to a fluid valve. A first portion of the fluid flow control member moves relative to a second portion of the fluid flow control member. The apparatus also includes means for guiding movement of the second portion relative to the first portion disposed within the fluid valve. The apparatus also includes a cavity formed between the first portion and the second portion, the first portion to move relative to the second portion to displace a seal disposed in the cavity when the second portion contacts a seat of the fluid valve.

The figures disclosed herein are not to scale. Wherever possible, the same reference numbers will be used throughout the drawings and accompanying written descriptions to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

A valve plug can have a seal (e.g., an O-ring) to prevent leakage of a process fluid (e.g., water, natural gas, etc.) past the valve plug during operation of a valve. The seal is typically composed of soft and/or hard materials (e.g., rubber, metal, graphite, etc.) depending on the operating conditions in which the seal is to function. In particular, seal materials may be selected based on a temperature, a pressure and/or a type of the process fluid that is to flow through the valve.

During certain fluid control applications (e.g., supplying feed water to a boiler), the valve plug may experience relatively high process fluid temperatures. Precipitate or particles within such high temperature process fluids (e.g., water) may degrade the seal of the valve plug. Additionally or alternatively, the valve plug seal can also deteriorate and/or wear due to friction caused by the seal sliding against a sealing surface, such as a wall of a cage within the valve (e.g., during stroking of the fluid valve). As a result, performance of the above known seals, valve plugs and/or fluid valves is adversely affected. For example, such known fluid valves cannot achieve a tight shut-off during normal use. Additionally, such degradation, deterioration and/or wear of the seal may cause a fluid valve to fail, incur costly repair(s) and/or require excessive maintenance for components contained therein.

Fluid flow control apparatus for use with fluid valves (e.g., a sliding stem valve, a rotary valve, etc.) are disclosed herein. Examples disclosed herein generally energize a seal of a fluid flow control member (e.g., any suitable valve plug such as a cylindrical plug, a conical plug, a tapered plug, etc.) and/or enable the seal to displace, for example, during a closure and/or an opening operation of a fluid valve. By enabling the seal to displace, examples disclosed herein provide a tight shut-off of the fluid valve while greatly reducing and/or substantially eliminating friction experienced by the seal and, thus, any wear, deterioration and/or degradation of the seal that would have otherwise occurred by using the above known seals, valve plugs and/or fluid valves. Thus, examples disclosed herein may extend the life of the seal and/or prevent costly repairs and/or maintenance of the fluid valve that would have otherwise been required.

In some disclosed examples, a valve plug for a fluid valve (e.g., a sliding stem fluid valve) has a first portion and a second portion spaced by a distance (e.g., 0.01 inches, 0.1 inches, etc.) relative to the first portion to provide a gap therebetween. The second portion moves toward and away from the first portion to reduce (e.g., close) and maintain the gap, respectively. A cavity formed in an outer surface of the valve plug between the first portion and the second portion has a seal disposed therein. The seal can be composed of a metal material, a graphite material, a rubber material and/or any other suitable material or combination of materials.

A dimension of the cavity changes as the first portion moves relative to the second portion to energize and/or displace the seal. For example, the fluid flow control member is coupled to a stem of the fluid valve, which causes the first portion and/or the second portion to move. In some examples, the seal compresses and/or displaces toward a cage of the fluid valve when the second portion moves toward the first portion (e.g., via a closure operation of the fluid valve), which provides a tight shut-off of the fluid valve. Conversely, the seal decompresses and/or displaces away from the cage when the second portion moves away from the first portion (e.g., via an opening operation of the fluid valve) in some examples, which reduces friction caused by the seal sliding against a sealing surface (e.g., a wall of the cage). In some examples, a wall of the cage has an annular groove disposed thereon such that the seal gradually engages the cage, which can further reduce and/or substantially eliminate friction experienced by the seal.

Additionally or alternatively, for the purpose of enhancing the displacement of the seal, a scallop or contoured seat is disposed between the seal and the first portion in some examples. In such examples, the scallop abuts the seal and the first portion. In some examples, one or more passageways extend radially inward from the cavity to one or more bleed ports of the valve plug. The bleed port(s) balance a fluid pressure contained within the fluid valve during use. In such examples, the passageway(s) convey a pressurized fluid from the bleed port(s) to the cavity, thereby displacing the seal when the fluid pressure increases and/or decreases. In other examples, the seal can have a particular cross-sectional shape (e.g., a semicircular cross-section, c-shaped cross-section, etc.).

Examples disclosed herein provide means for guiding movement of the second portion relative to the first portion, which aligns the first portion and the second portion relative to a common longitudinal axis and/or stabilizes movement of the portions relative to each other. In some examples, the means for guiding includes one or more of a wall of a cage, an aperture disposed on the second portion, an actuator stem, a recessed area disposed on the first portion and/or one or more pins disposed in the bleed port(s), which are disclosed in greater detail below in connection with FIGS. 2A, 2B, and 3. For example, the actuator stem may be fixedly coupled to the first portion and extend through the aperture disposed on the second portion in some examples. In such examples, a surface of the aperture engages a surface of the actuator stem, thereby aligning the first portion and the second portion relative to a common longitudinal axis.

Examples disclosed herein provide means for urging the first portion away from the second portion, which maintains the gap between the first portion and the second portion and/or reduces undesired movements (e.g., vibrations and/or fluctuations) between the first portion and the second portion. In some examples, a spring (e.g., a Bellville spring) is disposed between the first portion and the second portion. In some examples, the seal urges the first portion away from the second portion based on material properties of the seal (e.g., flexibility, strength, etc.)

Figure 1:
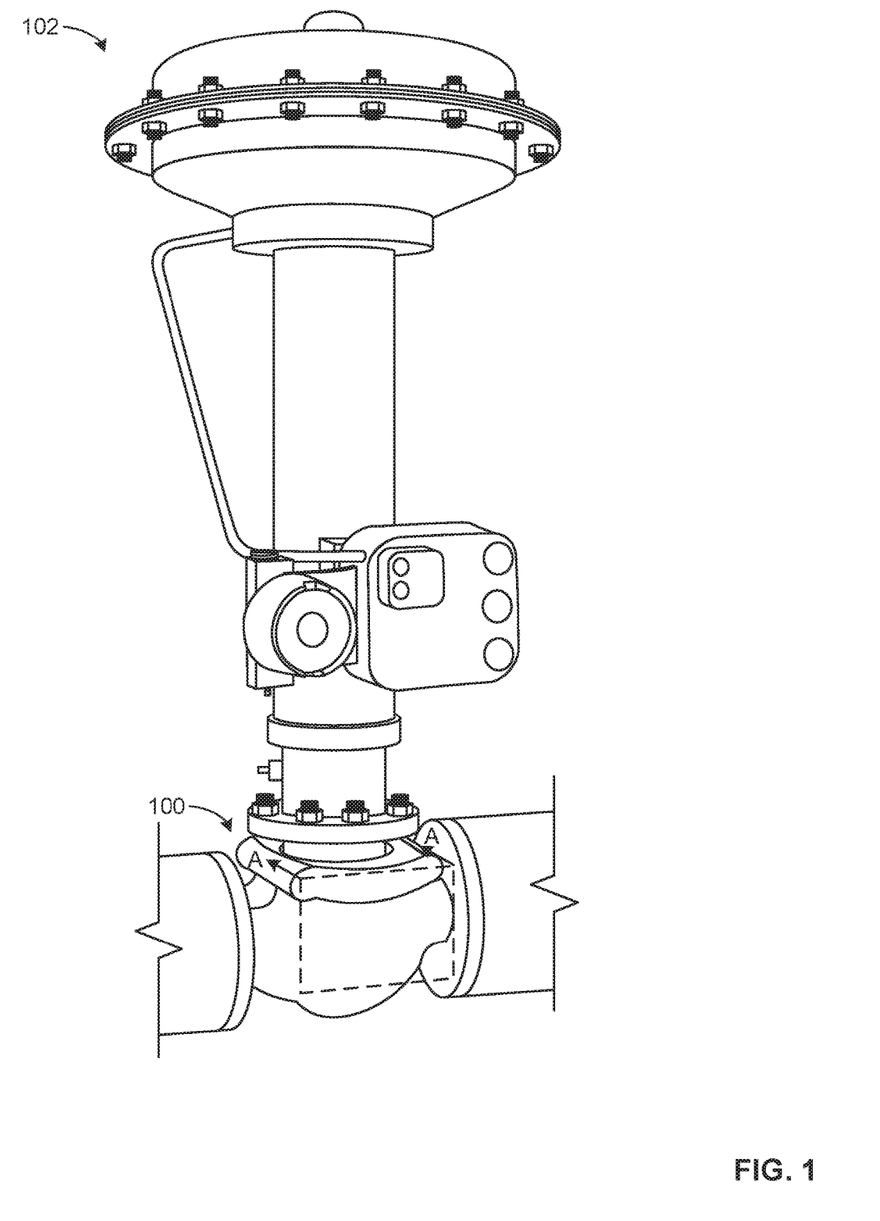
FIG. 1 illustrates an example fluid valve in which examples disclosed herein may be implemented.

FIG. 1 illustrates an example fluid valve 100 in which examples disclosed herein may be implemented. In this example, the fluid valve 100 is a sliding stem fluid valve having an actuator 102 operatively coupled thereto. A flow control member or valve plug 202 (shown in FIG. 2A) controls a flow of a process fluid (e.g., water, natural gas, etc.) through the fluid valve 100, which is disclosed in greater detail below in connection with FIG. 2A. In other examples, the examples disclosed herein can be implemented in any other suitable fluid valve (e.g., a rotary valve, etc.).

For the purpose of moving the valve plug 202 between an open position and a closed position, the fluid valve 100 of illustrated example includes the actuator 102. When the fluid valve 100 is closed (i.e., the valve plug 202 is in the closed position), the process fluid is substantially prevented from flowing therethrough. Conversely, when the fluid valve 100 is open (i.e., the valve plug 202 is in the open position), the process fluid is enabled to flow therethrough. The actuator 102 may be a pneumatic actuator, a hydraulic actuator, an electric actuator, etc. that causes the valve plug 202 to move. In this example, stem 206 (shown in FIG. 2A) is coupled between the actuator 102 and the valve plug 202 to transmit a pressure and/or a force to the valve plug 202 provided by the actuator 102, thereby moving the valve plug 202 between the closed position and the open position.

Figures 2A, 2B:
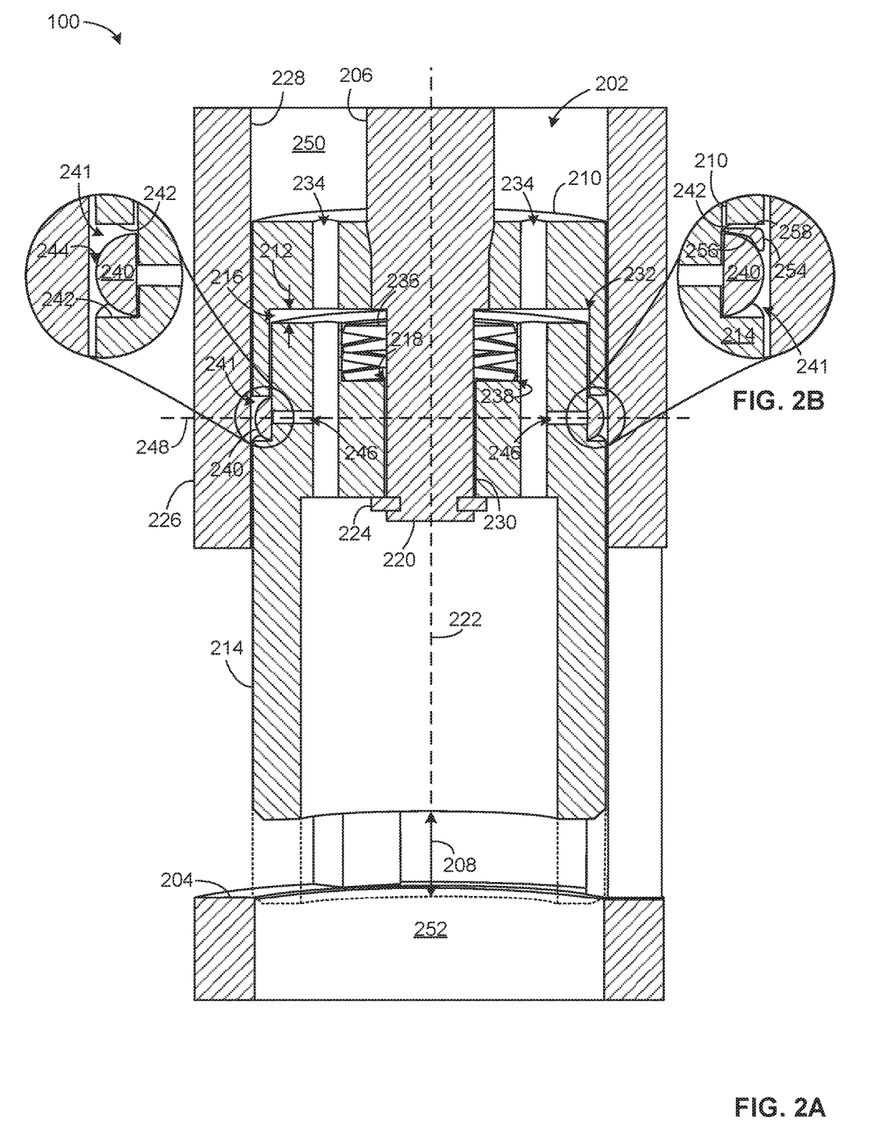
FIG. 2A is a detailed cross-sectional view of the example fluid valve of FIG. 1 and shows an example fluid flow control member in accordance with the teachings of this disclosure.
FIG. 2B is an enlarged cross-sectional view of a portion of the example fluid flow control member of FIG. 2A.

FIG. 2A is a detailed cross-sectional view of the example fluid valve 100 taken along plane A-A in FIG. 1 and shows the fluid flow control member 202 mentioned above in connection with FIG. 1. According to the illustrated example, the fluid flow control member 202 may be any suitable type of valve plug (e.g., a cylindrical plug, a conical plug, a tapered plug, etc.) that varies the flow of a process fluid through the fluid valve 100 when moved relative to (e.g., toward or away from) a valve seat 204. In particular, the stem 206 causes the fluid flow control member 202 to move along a direction generally indicated by a double arrow 208 between the open position and the closed position (represented by the dotted/dashed lines in FIG. 2A) of the fluid flow control member 202, which are both shown in FIG. 2A. When the fluid flow control member 202 is in the closed position (as represented by the dotted/dashed lines in FIG. 2A), the fluid flow control member 202 contacts and/or sealingly engages the valve seat 204, thereby significantly reducing or preventing flow of the process fluid through the fluid valve 100. Conversely, when the fluid flow control member 202 is in the open position as shown in FIG. 2A, the fluid flow control member 202 is separated from the valve seat 204, which enables the flow of the process fluid through the fluid valve 100.

According to the illustrated example, the fluid flow control member 202 has a first portion 210 spaced by a distance (e.g., 0.01 inches, 0.1 inches, etc.) 212 relative to a second portion 214 of the fluid flow control member 202 such that a gap (e.g., a uniform or non-uniform gap) 216 is provided between the first portion 210 and the second portion 214. In the illustrated example, the stem 206 extends through the first portion 210 and is fixedly coupled thereto. An aperture 218 is provided in the second portion 214 such that the aperture 218 receives the stem 206 in this example. Additionally, the stem 206 extends through the second portion 214 to expose an end 220 of the stem 206.

For the purpose of allowing the second portion 214 to move relative to the first portion 210, the first portion 210 is slidably coupled to the second portion 214. In some examples, the second portion 214 moves toward the first portion 210 along a common longitudinal axis 222 to reduce and/or close the gap 216 (e.g., via a closure operation of the fluid valve 100). In other examples, the second portion 214 moves away from the first portion 210 along the axis 222 to maintain the gap 216 (e.g., via an opening operation of the fluid valve 100). In the illustrated example, a travel stop 224 is disposed on the end 220 of the stem 206 to limit movement of the first portion 210 away from the second portion 214, thereby maintaining the gap 216 at the distance 212. In other words, the second portion 214 abuts the travel stop 224 to prevent the second portion 214 from moving away from the first portion 210 to exceed the gap 216.

According to the illustrated example, the fluid flow control member 202 has means for guiding movement of the second portion 214 relative to the first portion 210, which aligns the first portion 210 and the second portion 214 relative to the common longitudinal axis 222 and/or provides stability to the first portion 210 and the second portion 214 as they move. In some examples, the means for guiding is a cage 226 disposed within the fluid valve 100. For example, a wall (e.g., an inner circumferential wall) 228 of the cage surrounds the fluid flow control member 202 and engages the first portion 210 and/or the second portion 214. In such examples, an outer surface of the first portion 210 and/or the second portion 214 may be sized and shaped to match a surface of the wall 228 of the cage 226, which may enable the first portion 210 and/or the second portion 214 to easily slide against and/or abut the wall 228 of the cage 226.

In some examples, the means for guiding is the aperture 218 of the second portion 214 and/or the stem 206. For example, a wall 230 (e.g., a circumferential wall) of the aperture 218 surrounds and engages the stem 206. Similar to the wall 228 of the cage 226 disclosed above, the wall 230 of the aperture 218 may be sized and shaped to enable the stem 206 to easily slide against the wall 230 of the aperture 218.

In some examples, the means for guiding is a recessed area 232 disposed on the first portion 210 and oriented toward the second portion 214. For example, the recessed area 232 has a shape complementary to a shape of the second portion 214 and surrounds the second portion 214. Similar to the above-disclosed examples, a shape and size of the recessed area 232 can complement an outer surface of the second portion 214 to enable the second portion 214 to easily slide against the surface of the recessed area 232.

In some examples, the means for guiding includes one or more pins 326 (shown in FIG. 3) disposed in one or more bleed ports 234 of the fluid flow control member 202, which is disclosed in greater detail below in connection with FIG. 3.

For the purpose of maintaining the gap 216 between the first portion 210 and the second portion 214 (e.g., during an opening operation of the fluid valve 100), the fluid flow control member 202 has means for urging the first portion 210 away from the second portion 214. In some examples, the means for urging is a spring, such as a Bellville spring, a coil spring, etc. In the illustrated example, a Bellville spring 236 is disposed between the first portion 210 and the second portion 214. Additionally or alternatively, the second portion 214 of the illustrated example has a recessed area 238 disposed thereon oriented toward the first portion 210 and sized to contain the Bellville spring 236. In other examples, the means for urging can be any other suitable biasing element. For example, a seal 240 positioned between the first portion 210 and the second portion 214 can urge the first portion 210 away from the second portion 214, for example, based on material properties of the seal 240 such as its elasticity and/or strength. For clarity, the means for urging is referred to hereinafter as the spring 236, however, in other examples, the means for urging can be any other suitable biasing element.

According to the illustrated example, the fluid flow control member 202 has a cavity 241 formed in an outer circumferential surface of the fluid flow control member 202 by the first portion 210 and the second portion 214. The seal 240 of the illustrated example is disposed in the cavity 241 between the wall 228 of the cage, the first portion 210, and the second portion 214. The seal 240 can be an O-ring or a seal having a particular cross-section, which is disclosed in greater detail below in connection with FIG. 3. The seal 240 of the illustrated example has a semicircular cross-section and can be composed out of a rubber material, a metallic material, a graphite material and/or any other suitable material or combination of materials such that the seal 240 can sealingly engage the cage 226, the first portion 210 and/or the second portion 214 (e.g., during a closure operation of the fluid valve 100).

According to the illustrated example, a dimension of the cavity 241 changes to displace the seal 240 relative to the cage 226 and/or the fluid flow control member 202. The dimension of the cavity 241 changes when the first portion 210 moves relative to the second portion 214. For example, a volume of the cavity 241 decreases when the second portion 214 moves toward the first portion 210 along the axis 222, which causes the seal 240 to displace to forcefully engage the wall 228 of the cage 226, the first portion 210 and/or the second portion 214. In such examples, the second portion 214 can move toward the first portion 210 in response to the second portion 214 contacting the valve seat 204 (e.g., via a closure operation of the fluid valve 100). Conversely, the volume of the cavity 241 increases or expands to provide the gap 216 when the second portion 214 moves away from the first portion 210 along the axis 222 (e.g., during an opening operation of the fluid valve 100), which enables the seal 240 to decompress and/or disengage from the wall 228 in some examples. Additionally or alternatively, the wall 228 includes an annular groove 322 (shown in FIG. 3) to receive the seal 240 in some examples, which is disclosed in greater detail below in connection with FIG. 3.

According to the illustrated example, each of the first portion 210 and the second portion 214 has a surface 242 to contact the seal 240. In this example, each of the surfaces 242 is flat and/or horizontal (in the orientation of FIG. 2B). In other examples, one or more of the surfaces 242 can be inclined and/or non-flat (e.g., curved), which can enable the seal 240 to further displace during use of the fluid flow control member 202.

In the illustrated example of FIG. 2A, the fluid flow control member 202 is in the open position and the seal 240 is spaced by a relatively small distance (e.g., 0.01 inches, 0.001 inches, etc.) 244 relative to the wall 228 of the cage 226. In other examples, the seal 240 can contact the wall 228 when the fluid flow control member 202 is in the open position.

Additionally or alternatively, the fluid flow control member 202 of the illustrated example has one or more passageways 246 that extend radially inward from the cavity 241 to the bleed port(s) 234 of the fluid flow control member 202. In such examples, the passageway(s) 246 convey a pressurized fluid contained in the fluid valve 100 (e.g., in the bleed port(s) 234) to and/or from the cavity 241, thereby displacing the seal 240. For example, when a fluid pressure within the passageway(s) increases (e.g., during a closure operation of the fluid valve 100), the seal 240 displaces toward the wall 228 of the cage 226. Conversely, when the fluid pressure within the passageway(s) 246 decreases, the seal 240 can displace away from the wall 228 in some examples. In the illustrated example, the fluid flow control member 202 has two opposing passageways 246 that are positioned along a common axis 248. In other examples, the fluid flow control member 202 can have additional or fewer passageways 246.

For the purpose of balancing the fluid pressure between a first space 250 adjacent the fluid flow control member 202 and a second space 252 adjacent the fluid flow control member 202, the fluid flow control member 202 of the illustrated example has the bleed port(s) 234 disposed thereon extending therethrough along the axis 222. In this example, the fluid flow control member 202 is positioned between the first space 250 and the second space 252.

The bleed port(s) 234 of the illustrated example convey the pressurized fluid within the fluid valve 100 between the first space 250 and the second space 252, which provides stability to the fluid flow control member 202 when it is in the closed position and/or moves relative to the valve seat 204. For example, when the second portion 214 engages the valve seat 204 (e.g., via a closure operation of the fluid valve 100), a fluid pressure of the second space 252 may change (e.g., increase and/or decrease) relative to a fluid pressure of the first space 250. As a result, the pressurized fluid flows through the bleed port(s) 234, thereby balancing the fluid pressure between the first space 250 and the second space 252.

In the illustrated example, the first portion 210 has a first pair of bleed ports 234 extending therethrough. Similarly, the second portion 214 has a second pair bleed ports 234 extending therethrough and opposite to and/or aligned with the first of pair bleed ports 234, which enables the pressurized fluid to easily flow through the bleed ports 234. In other examples, the fluid flow control member 202 can have additional or fewer bleed ports 234.

FIG. 2B is an enlarged portion-view of the fluid flow control member 202 of FIG. 2A and shows the first portion 210, the second portion 214, and the seal 240 disposed in the cavity 241. The fluid flow control member 202 of the illustrated example has an example contoured seat or scallop 254 disposed between the seal 240 and the first portion 210 to engage both of the seal 240 and the first portion 210, which can enable the seal 240 to further displace. For example, the scallop 254 has a contoured surface 256 that matchably engages or abuts an outer surface of the seal 240. Similarly, the scallop 254 has another surface 258 that matchably engages or abuts the surface 242 of the first portion 210. In some examples, the scallop 254 can also be positioned between the second portion 214 and the seal 240. In other examples, a scallop 254 can be placed between both the seal 240 and the first portion 210 and the seal 240 and the second portion 214.

Figure 3:
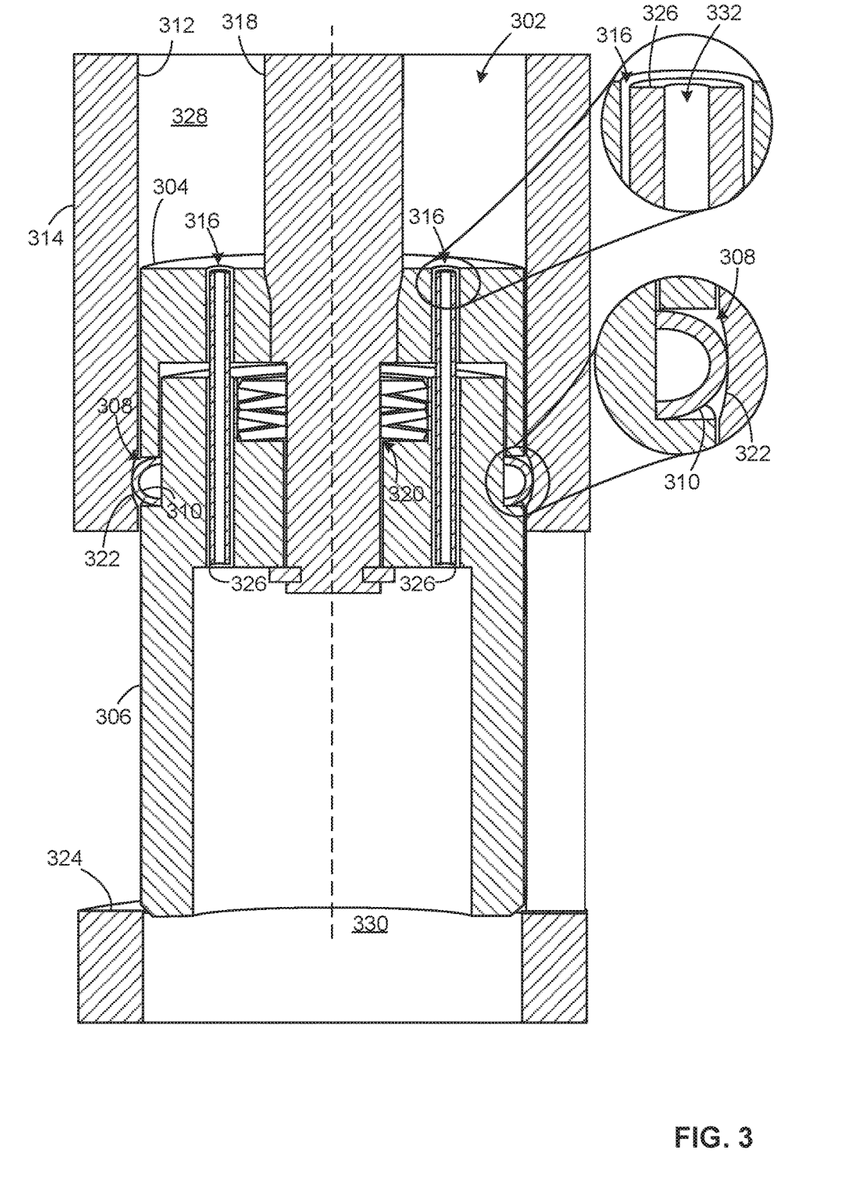
FIG. 3 is a detailed cross-sectional view of another example fluid flow control member that can be implemented in the example fluid valve of FIG. 1.

FIG. 3 shows a detailed cross-sectional view of another example fluid flow control member 302 that can be implemented in the fluid valve 100 of FIG. 1. Similar to the fluid flow control member 202 of FIGS. 2A and 2B, the fluid flow control member 302 of the illustrated example includes a first portion 304 slidably coupled to a second portion 306 to form a cavity 308 therebetween. A seal 310 is disposed in the cavity 308 between the first portion 304, the second portion 306 and/or a wall 312 of a cage 314. One or more bleed ports 316 extend through the fluid flow control member 302 in this example.

For the purpose of causing the first portion 304 and/or the second portion 306 to move, a stem 318 of the illustrated example is coupled to the first portion 304 and extends through the second portion 306 via an aperture 320 disposed on the second portion 306. In this example, the fluid flow control member 302 is in the closed position and the seal 310 is engaging the first portion 304, the second portion 306, and the wall 312 of the cage 314.

According to the illustrated example, an annular recess or groove 322 is disposed on the wall 312 of the cage 314 such that the annular groove 322 is positioned adjacent the cavity 308 when the fluid flow control member 302 is in the closed position, which is shown in FIG. 3. In such examples, the seal 310 gradually engages the annular groove 322, for example, as the second portion 306 slides toward and/or away from the first portion 304, which can reduce friction experienced by the seal 310. In some examples, the seal 310 engages the annular groove 322 as the fluid flow control member 302 moves toward and/or away from a valve seat 324. Conversely, the seal 310 can separate from and/or disengage the annular groove 322 in some examples.

In the illustrated example, each of the bleed ports 316 has a pin 326 extending through the first portion 304 and the second portion 306. As disclosed above, the pin(s) 326 can be the means for guiding movement of the second portion 306 relative to the first portion 304. In this example, each of the bleed ports 316 is shaped and sized to slidably receive the pin(s) 326 to enable the first portion 304 and the second portion 306 to easily slide against and/or abut the pin(s) 326. In some examples, additional or fewer pins 326 can be used with the example fluid flow control member 302.

For the purpose of balancing a fluid pressure between a first space 328 and a second space 330, one or more of the pins 326 of the illustrated example has a channel 332 extending through the length of the pin(s) 326. Similar to the bleed port(s) 316, the channel(s) 332 convey a pressurized fluid between the first space 328 and the second space 330, thereby balancing the fluid pressure. In this example, each of the pins 326 has a channel 332 extending its length. In other examples, each of the pins 326 can include additional or fewer channels 332.

In the illustrated example of FIG. 3, the seal 310 has a c-shaped cross-section, which can enhance a flexibility of the seal 310 and/or enable the seal 310 to further displace when the first portion 304 slides relative to the second portion 306. In other examples, the seal 310 can have any other suitable shaped cross-section.

As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

From the foregoing, it will be appreciated that the above disclosed apparatus enable a seal to displace within a fluid valve. By enabling the seal to displace, examples disclosed herein provide a tight shut-off of the fluid valve while greatly reducing and/or eliminating friction experienced by the seal and, thus, any wear, deterioration and/or degradation of the seal that would have otherwise occurred. Therefore, examples disclosed herein may extend the life of the seal and/or prevent costly repairs and/or maintenance of the fluid valve and/or components contained therein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a plug for a sliding stem fluid valve, the plug having a first portion slidably coupled to a second portion, the second portion to contact a first seat of the fluid valve to close the fluid valve;
a cavity formed in an outer circumferential surface of the plug by the first portion and the second portion, an axial dimension of the cavity to decrease when the first portion slides toward the second portion, the decrease to radially outwardly displace a seal disposed in the cavity, the seal having a flat inner surface and a curved outer surface located opposite the flat inner surface, the flat inner surface engaging the second portion, the curved outer surface configured to engage an inner circumferential wall of a cage of the fluid valve in response to the second portion contacting the first seat; and
a second seat disposed in the cavity between the seal and the first portion or the second portion, the second seat having a curved surface configured to engage the outer curved surface of the seal as the first portion slides toward the second portion to assist in radially outwardly displacing the seal.

2. The apparatus of claim 1, further including a spring disposed between the first portion and the second portion, the spring to urge the first portion away from the second portion.

3. The apparatus of claim 1, wherein the first portion includes a first bleed port and the second portion includes a second bleed port opposing the first bleed port.

4. The apparatus of claim 3, wherein the second portion includes a passageway that extends radially inward from the cavity through the second portion to the second bleed port, the passageway to convey a pressurized fluid from the second bleed port to the flat inner surface of the seal.

5. The apparatus of claim 3, further including a pin disposed in the first bleed port and the second bleed port, the pin to align the first portion and the second portion relative to a common longitudinal axis.

6. The apparatus of claim 5, wherein the pin includes a channel, a fluid to flow through the channel.

7. The apparatus of claim 1, wherein the second portion includes an aperture, a stem of the fluid valve to extend through the aperture.

8. The apparatus of claim 7, wherein an end of the stem includes a travel stop to engage the second portion.

9. The apparatus of claim 7, wherein the stem engages a wall of the aperture to align the first portion and the second portion relative to a common longitudinal axis.

10. The apparatus of claim 1, wherein the inner circumferential wall of the cage is configured to engage the first portion and the second portion to align the first portion and the second portion relative to a common longitudinal axis.

11. The apparatus of claim 10, wherein the inner circumferential wall of the cage includes an annular groove, the outer curved surface of the seal to engage the annular groove as the first portion slides toward the second portion.

12. The apparatus of claim 1, wherein the seal has a semicircular cross-sectional shape defined by the flat inner surface and the curved outer surface of the seal.

13. The apparatus of claim 12, wherein the second seat is disposed in the cavity between the seal and the first portion, the curved surface of the second seat being concave downward, the second seat further including a second surface located opposite the curved surface and configured to engage the first portion.

14. An apparatus comprising:
a fluid flow control member of a fluid valve, the fluid flow control member having a first portion and a second portion, the first portion fixedly coupled to a stem of the fluid valve, the second portion slidably coupled to the stem and the first portion, the second portion to contact a first seat of the fluid valve to close the fluid valve;
a cavity formed in an outer circumferential surface of the fluid flow control member, the cavity defined by the first portion and the second portion, an axial dimension of the cavity to decrease when the first portion slides toward the second portion, the decrease to radially outwardly displace a seal disposed in the cavity, the seal having a flat inner surface and a curved outer surface located opposite the flat inner surface, the flat inner surface engaging the second portion, the curved outer surface configured to engage an inner circumferential wall of a cage of the fluid valve in response to the second portion contacting the first seat; and
a second seat disposed in the cavity between the seal and the first portion or the second portion, the second seat having a curved surface configured to engage the outer curved surface of the seal as the first portion slides toward the second portion to assist in radially outwardly displacing the seal.

15. The apparatus of claim 14, further including a spring disposed between the first portion and the second portion, the spring to urge the first portion away from the second portion.

16. The apparatus of claim 14, wherein the first portion includes a first bleed port and the second portion includes a second bleed port, the first bleed port opposing the second bleed port, the second portion further including a passageway that extends radially inward from the cavity through the second portion to the second bleed port, the passageway to convey a pressurized fluid from the second bleed port to the flat inner surface of the seal.

17. The apparatus of claim 14, wherein the second portion includes an aperture, the stem to extend through the aperture to expose an end of the stem.

18. The apparatus of claim 17, wherein the end of the stem includes a travel stop to engage the second portion.

19. An apparatus comprising:
a fluid flow control member operatively coupled to a fluid valve, a first portion of the fluid flow control member spaced by a distance relative to a second portion of the fluid flow control member, the second portion to contact a first seat of the fluid valve to close the fluid valve;
means for guiding movement of the second portion relative to the first portion, the means for guiding disposed within the fluid valve;
a cavity formed in an outer circumferential surface of the fluid flow control member, the cavity defined by the first portion and the second portion, an axial dimension of the cavity to decrease when the first portion slides toward the second portion, the decrease to radially outwardly displace a seal disposed in the cavity, the seal having a flat inner surface and a curved outer surface located opposite the flat inner surface, the flat inner surface engaging the second portion, the curved outer surface configured to engage an inner circumferential wall of a cage of the fluid valve in response to the second portion contacting the first seat; and
a second seat disposed in the cavity between the seal and the first portion or the second portion, the second seat having a curved surface configured to engage the outer curved surface of the seal as the first portion slides toward the second portion to assist in radially outwardly displacing the seal.

20. The apparatus of claim 19, further including means for urging the first portion away from the second portion, the means for urging disposed between the first portion and the second portion.

21. The apparatus of claim 19, wherein the second portion includes a passageway extending radially inward from the cavity through the second portion to a bleed port disposed within the second portion of the fluid flow control member, the passageway to convey a pressurized fluid from the bleed port to the flat inner surface of the seal.

\* \* \* \* \*